Patented Nov. 7, 1950

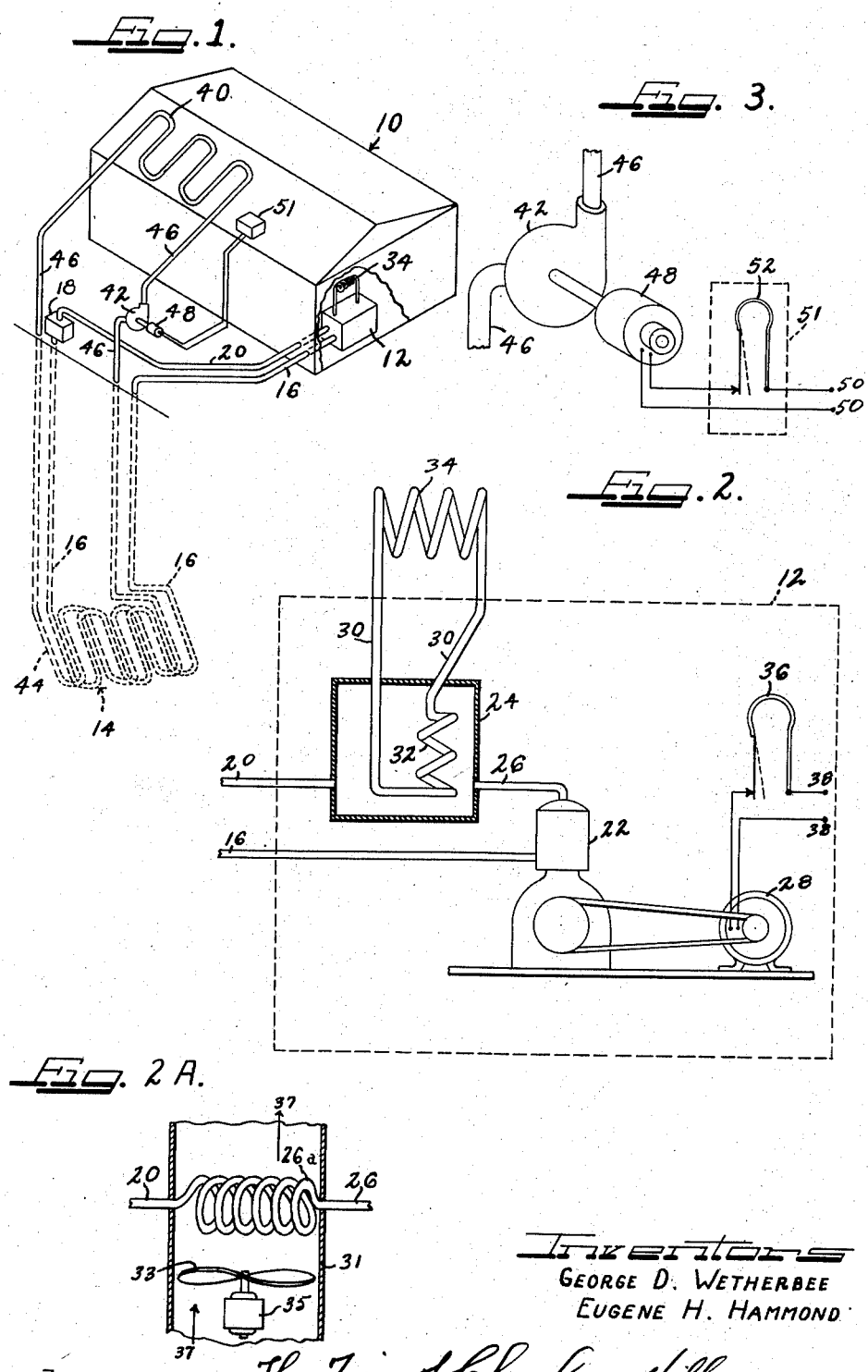

2,529,154

UNITED STATES PATENT OFFICE 2,529,154

HEATING SYSTEM

Eugene H. Hammond, Berwyn, and George D. Wetherbee, Chicago, Ill.; said Wetherbee assignor to said Hammond Application December 30, 1947, Serial No. 794,722

11 Claims. (Cl. 237—1)

Our invention relates to systems for heating the air within rooms or other enclosures, and particularly to such systems utilizing heat pumps or reversed refrigerating cycles.

Heat pumps or reversed cycle refrigerating systems may be employed to transfer thermal energy from low temperature or low grade heat sources to heat the air within the rooms of dwelling houses or other buildings. A heat pump commonly comprises a compression refrigerating system including two heat exchangers, a compressor, and an expansion valve. One of the heat exchangers, the inside heat exchanger or condenser, is arranged and disposed to heat the air in the enclosure, and the other heat exchanger, the outside heat exchanger or evaporator, is arranged outside the enclosure to absorb heat from the low grade heat source. In some installations the refrigerating system is made reversible and each of the exchangers may be operated either as a condenser or as an evaporator, depending on whether the building is to be heated, as during winter operation, or cooled, as during summer operation.

It is well known that the efficiency and capacity of a reversed cycle refrigerating system or heat pump drops off when the heat must be absorbed by the outside heat exchanger at lower temperatures. Moreover, in practical installations, at the time the temperature of the outside heat exchanger tends to drop, the heat loss from the room or enclosure heated increases because of the lower outside air temperature. For these reasons the power demand as well as the capacity of the equipment of a heating system utilizing a refrigerating machine must not only be greater during periods of low outdoor temperature than at other times but increases out of proportion to the change in outdoor temperature.

It has heretofore been attempted to equalize the power requirements and reduce the size of the compressors and other equipment necessary in a reversed refrigerating type heating system by disposing the outside heat exchanger to absorb heat from a heat reservoir such as a body of water, or the earth itself. Thus rapid variations in outdoor air temperature are not reflected in rapid changes in temperature at the outdoor heat exchanger. While this has permitted improvement over the operation of an equivalent system with the outside heat exchanger disposed in the air, the heat storage ability of the earth in many locations is inadequate to carry the operation of the heating system over the prolonged winter period of cold weather when heat is being continually drained from this source and no fresh heat is supplied thereto. For this reason this system has thus far found little application to heating buildings in cold climates.

In accordance with the present invention the aforementioned difficulties associated with heating systems of the reversed refrigeration type are overcome by the provision of mechanism to extract heat from the atmosphere or to utilize solar energy impinging on the earth and to transfer this heat to the earth or other heat storage medium at the irregular intervals when this energy is of substantial quantity. In this fashion the heat energy absorbed from the heat storage medium is restored and the temperature of the earth or other medium in proximity to the outside heat exchanger is maintained at a higher temperature and the capacity and efficiency of the system accordingly improved.

It is therefore an object of the present invention to provide an improved heating system of the heat pump or reversed refrigeration type which is capable of operating at substantially increased capacity and efficiency during cold weather.

Further it is an object of the present invention to provide an improved heating system of the reversed refrigeration type wherein operation at high capacity and efficiency is achieved even during prolonged periods of cold weather.

Yet another object of the present invention is to provide an improved heating system of the reversed refrigerating type having features of simplicity of construction and reliability of operation, together with inexpensiveness of manufacture and installation to the end that a unit of maximum utility be achieved. This would include substantially less buried pipe than when atmospheric and solar heat are not utilized.

The novel features which we believe to be characteristic of the present invention are set forth with particularity in the appended claims. Our invention, itself, however, both as to its organization and method of operation, together with further objects and advantages thereof, may best be understood by reference to the following description taken in connection with the accompanying drawings.

On the drawings:

Figure 1 is a somewhat diagrammatic isometric view showing a complete heating system incorporating the principles of the present invention;

Figure 2 is a more detailed view showing the compressor and the inside heat exchanger portions of the system of Figure 1, together with the electrical controls therefor;

Figure 2a is a partially cross section view of a modified form of the inside heat exchanger portion of the system; and Figure 3 is a detailed view showing the pump of the heat transfer portion of the system of Figure 1 and the electrical control therefor.

As shown on the drawings:

Referring now to Figure 1, the object to be heated is shown generally as the building 10 which, for purposes of illustration, is shown as having only a single room. A corner of the building 10 is broken away to show in full view the enclosure 12 which contains the compressor and inside heat exchanger of the reversed refrigerating system utilized to supply heat to the building 10. The outside heat exchanger portion of the reversed refrigerating heating system is shown generally at 14 and comprises a series of coils or bends in pipe 16, the purpose of these coils or bends being to provide a maximum contact area between the pipe 16 and the earth. Pipe 16 is connected at one end to the compressor portion of the units contained within enclosure 12 and at the opposite end to the expansion valve indicated at 18. The pipe 20 connects the expansion valve 18 to the heat exchanger portion of the unit contained within enclosure 12. The expansion valve 18, shown diagrammatically in the view of Figure 1, includes a fluid flow obstructing element capable of opposing the flow of fluid from pipe 20 to pipe 16 so that the pressure in the latter pipe is less than that in the former pipe and throttling action takes place as the fluid passes through the valve 18.

The units disposed within enclosure 12 are best seen in the view of Figure 2. As will be evident from this view the pipe 16 is in fluid communication with the cylinder of compressor 22 and the pipe 20 is connected to the heating or condensing chamber 24. Pipe 26 connects chamber 24 and compressor 22. A motor 28 is connected to drive compressor 22.

Compressor 22 is provided with a cylinder and piston, together with suitable valves so that rotation of motor 28 causes greater pressure in pipe 26 than in pipe 16, together with transfer of fluid from pipe 16 to pipe 26.

The above elements comprise the heat pump or reversed refrigerator heating system portions of the present invention. Rotation of motor 28 causes operation of compressor 22 to cause fluid to be pumped from pipe 16 to pipe 26. The fluid, which may be any one of the various refrigerating fluids commonly employed for the purpose as, for example, dichloro-difluoro methane, is compressed in compressor 22. This compression increases the temperature of the fluid so that when it passes through pipe 26 it is at relatively high temperature and condenses in chamber 24. From chamber 24, the fluid passes through pipe 20 to expansion valve 18 whence it passes to the lower pressure region within pipe 16. In expansion valve 18 the temperature of the liquid is reduced and it passes to pipe 16 at a relatively low temperature and thence to heat exchanger 14 where it evaporates and becomes a gas.

It is the function of the pipe 30, together with coils 32 and 34 to transfer heat from the warm condensing fluid contained within chamber 24 to the spaces desired to be heated within building 10. To this end, a fluid, such as water, is contained within these pipes and the coil 34 is disposed to heat the spaces. Thus, as warm fluid passes to chamber 24 from pipe 26, the coil 32 is heated and convection fluid flow through pipe 30 and coils 32 and 34 takes place to heat coil 34. Air flow about this coil, together with radiant heat transfer therefrom then heats the spaces within building 10.

The term "inside heat exchanger" is employed in the present specification to refer to the element for transferring the heat from the warm fluid within chamber 24 to the spaces desired to be heated. It will, of course, be evident that heat transfer might be direct from chamber 24, or even from pipe 26 itself.

A modified form of the inside heat exchanger wherein the heat transfers directly from pipe 26 to the air is shown in the view of Figure 2a. As will be evident from this figure, the pipe 26 has a coiled portion 26a with or without extended surface located next to the junction with pipe 20 and which is surrounded by a duct 31 (shown in cross section). A fan 33 driven by motor 35 is located in this duct to cause air to flow therethrough and about the coil 26a as is indicated by the arrows 37. Thus as the coil 26a is heated by the passage of compressed fluid therethrough, heat is transferred to the air flowing through duct 31 and the spaces are heated as desired.

It is the function of the outside heat exchanger 14 to supply heat to the cool fluid contained within pipe 16. This exchanger is shown for purposes of illustration as merely a coil in pipe 16, the coil being located in the ground or other reservoir. As the fluid from pipe 20 passes through expansion valve 18, its temperature is reduced and as it reaches the heat exchanger 14 it is of lower temperature than the surrounding earth, thus causing heat flow from the earth to the fluid. Thus the operation of the reversed refrigerating portion of the present invention is to take heat at relatively low temperature from the outside heat exchanger 14 and release heat at relatively high temperature from coil 34.

It is the function of the bi-metal thermostat 36 to control the operation of motor 28 to maintain the temperature within the building 10 at a predetermined value. When the thermostat 36 is in the position shown in the solid lines of Figure 2, the terminals 38, to which a source of electrical energy is connected, are electrically connected to motor 28 and the latter operates to cause the pumping action in compressor 22 necessary for operation of the heat pump. However, the thermostat 36 is disposed to partake of the temperature within building 10 so that when this temperature exceeds a predetermined value the thermostat 36 rotates to the position shown in the dashed lines of Figure 2 and interrupts the electrical connection from terminals 38. The motor 28 ceases to operate and pumping action of compressor 22 is discontinued, thereby preventing operation of the heat pump.

Outside heat exchanger 14 is disposed below the surface of the earth where it is thermally isolated from the outside air temperature so that when the outside air temperature decreases as, for example, at night, the temperature of the ground about outside heat exchanger 14 remains substantially constant. Moreover, during spells of cold weather the outside heat exchanger 14 tends to be exposed to a more nearly constant temperature than that of the outdoor air. It is well known that the higher the temperature at outside heat exchanger 14, the greater the heat to be obtained from coil 34 becomes and that as this temperature falls, it becomes increasingly difficult to secure the required amount of heat for building 10. Moreover, it is well known that the efficiency of the unit (heat released at coil 34 per kilowatt hour consumed by motor 28) increases as the temperature differential between outside heat exchanger 14 and the room heated is reduced.

It is the function of absorber coil 40, pump 42 and heat exchanger 44, to transfer heat to heat exchanger 14 and/or the regions of the earth close to outside heat exchanger 14 when solar energy is impinging upon absorber coil 40 or when heat can be absorbed from the atmosphere by coil 40. To this end, absorber coil 40, pump 42, and heat exchanger 44 are connected to form a complete fluid circulating path by pipe 46 and the entire system is filled with some fluid as, for example, water. Preferably, of course, a fluid such as alcohol should be added to the water to prevent freezing. Alternatively brine may be used for this purpose. As pump 42 operates, the fluid contained within this portion of the system circulates and passes from the absorber coil 40 to the heat exchanger 44. Inasmuch as the temperature of the fluid is increased at absorber coil 40 by reason of the solar energy or atmospheric heat, the fluid passing through heat exchanger 44 causes the temperature of heat exchanger 14 and/or the earth about outside heat exchanger 14 to increase, thereby supplying heat energy directly to heat exchanger 14 and/or to this portion of the earth and compensating for the heat energy previously withdrawn by the operation of the heat pump or reversed refrigerating cycle heating system.

The operation of the heat replenishing system comprising absorber coil 40, pump 42 and heat exchanger 44 is dependent on the existence of a sufficient amount of solar radiation on or a sufficiently high atmospheric temperature around absorber coil 40 to heat the liquid therein to a temperature in excess of that of the earth surrounding heat exchanger 14 and 44. When the temperature of absorber coil 40 falls below this value the unit will not operate to heat the earth. In order that this operation may be automatically secured, we provide an automatic mechanism to energize the pump 42 in accord with the temperature of absorber coil 40 whether heated by solar energy or outdoor air temperature or both. To this end, pump 42 is connected to be driven by motor 48 which in turn is connected to terminals 50 through thermostat 52. The terminals 50 are connected to a source of electrical energy so that motor 48 is energized in accord with the position of thermostat 52.

The thermostat 52 is constructed to assume the motor deenergizing position shown in the dotted lines, Figure 3, when the temperature thereof falls below a predetermined limit. Moreover, it is located so that the temperature of the thermostat 52 varies in accord with the temperature of the liquid in absorber coil 40 and the pump 42 is operated only when the temperature of the absorber coil 40 exceeds the predetermined minimum.

Consequently, when sufficient heat is absorbed by coil 40 to permit heating of the earth about outside heat exchanger 14, the pump 42 operates to cause this heat transfer but when the heat absorbed falls below this value the pump 42 does not operate. Thus when absorber coil 40 is warmer than heat exchanger 14, the pump should operate but not when the reverse condition exists.

Having described the elements of a heating system constructed in accord with the present invention, we will now describe briefly the operation thereof. In the summer and fall of the year, the solar energy or atmospheric heat impinging upon absorber 40 will heat that absorber to a relatively high temperature, and pump 42 will be operated a substantial portion of the daylight hours, thereby causing the earth about heat exchanger 44 to increase in temperature to a substantial degree above the temperature that would exist in the absence of this heat supply. During this period of time, the heat requirements of building 10 are relatively small and the compressor 22 is operated only during a small period of time so that a relatively small amount of heat is withdrawn from the soil about coils 14 and 44. As the cooler weather progresses, the rate of heat removal from the soil about outside heat exchanger 14 increases. However, during the daylight hours when the sun is out and radiant energy impinges upon absorber 40, there is nevertheless a substantial amount of heat supplied to the soil about exchangers 44 and 14 during these hours so that the temperature thereof does not fall to the extent that would be anticipated in view of the amount of heating of building 10. Should a cold spell occur, for example, the heat withdrawn from the soil about exchanger 14 is relatively great and little heat is supplied from heat exchanger 44. On the other hand, during the warm spells between successive cool spells the opposite effect takes place. Thus by replenishing the heat supply to the soil about exchanger 14 as the weather permits, the temperature of this soil is maintained at reasonably high values despite cool weather and the efficiency and effectiveness of the reversed refrigerator heating system improves accordingly.

It will be apparent to those skilled in the art that the mechanism herein illustrated and described is one of many embodiments of the present invention that may be used and practiced. For example, while we have shown a simple bimetal thermostat control for a motor 48 of pump 42 which is operable only in response to a predetermined temperature of absorber 40, a control may be used which is sensitive ether directly or indirectly to the temperature difference between the soil about exchanger 14 and the temperature of the fluid within absorber 40, thereby taking into account the fact that it is this temperature difference rather than any fixed temperature that determines the advisability of operating pump 42. Moreover, for heating the building 10 during periods when substantial amounts of solar energy are received but nevertheless the air temperature itself is low, a bypass may be provided to cause warm fluid to pass directly from absorber 40 to a heating coil such as 34. It will further be evident to those skilled in the art that while we have described and illustrated our invention as using the earth as a heat storage medium, other mediums providing a suitable heat reservoir may be used as, for example, a pool of water.

Moreover, while we have described our invention in connection with the heating of a space or room in a building it may be used for other purposes as well. One use is that of heating the surfaces of concrete roadways and the like by burying the pipe 26 in the concrete itself. In this case heat transfers from the pipe directly to the concrete to raise the temperature thereof and melt any ice and snow deposited thereon during cool weather.

In an alternative embodiment of the present invention, the pipes 44 and 14 may be mounted coaxially or side by side in intimate contact in all or part of their lengths below the surface of the earth, thus exposing both pipes to the same portions of the earth and providing a highly efficient heat transfer from pipe 44 to pipe 14.

While we have shown a particular embodiment of our invention, it will, of course, be understood that we do not wish to be limited thereto since many modifications, both in the elements employed and their cooperative structure, may be made without departing from the spirit and scope of our invention. We, of course, contemplate by the appended claims to cover any such modifications as fall within the true spirit and scope of our invention.

In the foregoing specification and the accompanying claims we have used the term "atmospheric energy" to designate heat energy received by a heat exchanger thermally exposed to the earth's atmosphere, whether the actual solar heat absorbed is from the sun or from the heated air itself.

What we claim as new and desire to secure by Letters Patent in the United States is:

1. A heat system comprising in combination a reversed refrigerating unit including an outside heat exchanger from which heat is taken at relatively low temperature and an inside heat exchanger to which heat is supplied at relatively high temperature, said outside heat exchanger being disposed in the earth to absorb heat from the surrounding soil, and mechanism to replenish the heat in said soil, said mechanism including a first heat exchanger containing a path for fluid flow and disposed in said soil and a second heat exchanger containing a path for fluid flow above the earth to receive solar energy, pipes connecting said paths to form a fluid circulating path, a fluid in said pipes and said paths, and a pump selectively operable to cause circulation of said fluid when atmospheric energy impinging on said second heat exchanger exceeds a predetermined minimum value.

2. A heating system comprising in combination a reversed refrigerating unit including an outside heat exchanger from which heat is taken at relatively low temperature and an inside heat exchanger to which heat is supplied at relatively high temperature, said outside heat exchanger being disposed in the earth to absorb heat from the surrounding soil, and mechanism to replenish the heat in said soil, said mechanism including a first heat exchanger containing a path for fluid flow and disposed in said soil and a second heat exchanger containing a path for fluid flow above the earth to receive atmospheric energy, pipes connecting said paths to form a fluid circulating path, a fluid in said pipes and said paths, and a pump selectively operable to cause circulation of said fluid when the temperature of said second heat exchanger exceeds a predetermined minimum value.

3. A heating system for an enclosed space comprising, in combination, a soil-type heat pump unit for extracting thermal energy from the soil and supplying this energy to the closed space, an atmospheric heat absorber, means for supplying thermal energy from said absorber to the soil to replace at least a portion of the thermal energy extracted therefrom by said pump, and means for controlling the amount of atmospheric thermal energy supplied to the soil in accordance with the amount of atmospheric thermal energy absorbed by said heat absorber unit.

4. A heating system for an enclosed space comprising, in combination, a first heat exchanger disposed in the soil outside said space, means for circulating a heat exchange fluid through said first heat exchanger to extract thermal energy from the soil surrounding said first heat exchanger, means disposed within said space for supplying to the space the heat energy extracted from the soil by said first heat exchanger, a second heat exchanger disposed in the soil in thermal proximity to said first heat exchanger, means for supplying atmospheric thermal energy to said second heat exchanger to heat the soil surrounding the first heat exchanger, and means for interrupting the flow of atmospheric thermal energy to said second heat exchanger when the value of said atmospheric thermal energy drops below a predetermined minimum, whereby said second heat exchanger, by supplying thermal energy to the soil surrounding said first heat exchanger, supplies the soil with additional thermal energy which is subsequently extracted by said first heat exchanger as needed.

5. A heating system for an enclosed space comprising a first heat exchanger disposed in the earth outside the space, a second heat exchanger disposed inside said space, heat transfer means connecting said first and second heat exchangers for extracting heat from the earth at relatively low temperatures by means of said first heat exchanger and for supplying heat at relatively high temperatures to said second heat exchanger, an atmospheric heat absorber exposed to the atmosphere outside said space, a third heat exchanger disposed in the earth in thermal proximity to said second heat exchanger, and heat transfer means for supplying heat from said heat absorber to said third heat exchanger when the temperature within said heat absorber is greater than a predetermined minimum, whereby heat from said heat absorber is supplied to the soil through said third heat exchanger and thence to said first heat exchanger to increase heat transfer to said space.

6. A heating system for an enclosed space comprising, in combination, a reversed refrigeration unit, including a first fluid type heat exchanger disposed in the earth outside said space, a second fluid type heat exchanger disposed within said space, means for conveying heat exchange fluid from said first heat exchanger to said second heat exchanger to extract heat from the earth surrounding said first heat exchanger and to supply heat therefrom to said second heat exchanger; an atmospheric heat absorber unit including a third heat exchanger disposed in the earth in thermal proximity to said first heat exchanger, a fourth heat exchanger outside said space and exposed to the atmosphere, and means for conveying heat exchange fluid from said fourth heat exchanger to said third heat exchanger to supply atmospheric thermal energy to the surrounding earth and to said first heat exchanger; and thermostatic means for controlling the flow of thermal energy between said third heat exchanger and said first heat exchanger in accordance with the amount of atmospheric thermal energy absorbed by said heat absorber unit.

7. A heating system for an enclosed space comprising, in combination, a reversed refrigeration unit including a first fluid type heat exchanger disposed in the soil outside said closed space, a second fluid type heat exchanger disposed within said space, and means for conveying heat exchange fluid from said first exchanger to said second exchanger to extract heat from the soil surrounding said first heat exchanger and to supply heat to said second heat exchanger; an atmospheric heat absorber unit including a third heat exchanger disposed in the soil in thermal proximity to said first heat exchanger, a fourth heat exchanger outside the space and exposed to the atmosphere, and means for conveying heat exchange fluid from said fourth heat exchanger to said third heat exchanger to supply atmospheric thermal energy to the surrounding soil and to said first heat exchanger; and thermostatic means for interrupting the flow of heat from said heat absorber unit to the soil at a predetermined minimum heat exchange fluid temperature in said atmospheric heat absorber.

8. In a heating system for an enclosed space including a soil-type heat pump unit having a heat exchanger buried in the soil and means for supplying to the space heat extracted from the soil by said heat exchanger, an atmospheric heat absorber unit having a heat exchanger buried in the soil in thermal proximity to the pump unit heat exchanger and means for supplying atmospheric heat energy to the absorber unit heat exchanger, the improvement which comprises thermostatic control means for regulating the amount of atmospheric heat energy introduced into the soil through said atmospheric absorber unit, whereby the heat content of the soil is replenished by said atmospheric heat absorber unit to compensate for the removal of heat from the soil by said heat pump unit.

9. In a heating system for an enclosed space, including a soil-type heat pump unit having a heat exchanger buried in the soil and means for supplying to the space heat extracted from the soil by said heat exchanger and an atmospheric heat absorber unit having a heat exchanger buried in the soil in thermal proximity to heat pump heat exchanger and means for supplying atmospheric heat energy to the absorber unit heat exchanger, the improvement which comprises thermostatic control means for regulating the amount of atmospheric heat energy introduced into the atmospheric absorber unit heat exchanger in accordance with the amount of heat absorbed by said atmospheric heat absorber to operate said heat absorber unit only at those times when an amount of heat energy greater than a predetermined minimum is being absorbed by said heat absorber unit.

10. In a heating system for an enclosed space including a soil-type heat pump unit having a heat exchanger buried in the soil and means for supplying to the space heat extracted from the soil by said heat exchanger, means for replenishing the heat content of the soil surrounding the pump unit heat exchanger comprising a heat exchanger in thermal proximity to the heat exchanger of said pump unit, an atmospheric heat absorber for supplying atmospheric heat to said additional heat exchanger, and means for controlling the amount of atmospheric heat energy introduced into said additional heat exchanger in accordance with the amount of heat absorbed by said heat absorber, whereby the heat content of the soil is replenished through said heat absorber unit and the heat exchanger associated therewith to compensate for the removal of heat from the soil by the heat exchanger of said heat pump unit.

11. In a heating system for an enclosed space including a soil-type heat pump unit having a heat exchanger buried in the soil and means for supplying to the space heat extracted from the soil by said heat exchanger, the improvement which comprises an atmospheric heat absorber unit for supplying heat to the soil in thermal proximity to said heat exchanger to replenish the heat content of the soil, and means for controlling the amount of heat introduced into the soil in accordance with the amount of heat absorbed by said heat absorber unit.

EUGENE H. HAMMOND.
GEORGE D. WETHERBEE.

REFERENCES CITED

The following references are of record in the file of this patent:

UNITED STATES PATENTS

| Number | Name | Date |
|---|---|---|
| 2,135,742 | Brace et al. | Nov. 8, 1938 |
| 2,167,878 | Crawford | Aug. 1, 1939 |
| 2,279,657 | Crawford | Apr. 14, 1942 |
| 2,342,211 | Newton | Feb. 22, 1944 |
| 2,484,371 | Boyston | Oct. 11, 1949 |

FOREIGN PATENTS

| Number | Country | Date |
|---|---|---|
| 453,960 | France | June 23, 1913 |